United States Patent
Maack et al.

(10) Patent No.: US 7,864,993 B2
(45) Date of Patent: Jan. 4, 2011

(54) DEVICE AND METHOD FOR CORRECTING DEFECTS IN X-RAY IMAGES

(75) Inventors: Hanns-Ingo Maack, Norderstedt (DE); Andreas Kloessner, Hamburg (DE)

(73) Assignee: Koninklijke Philips Electronics N.V., Eindhoven (NL)

( * ) Notice: Subject to any disclaimer, the term of this patent is extended or adjusted under 35 U.S.C. 154(b) by 1001 days.

(21) Appl. No.: 10/595,967

(22) PCT Filed: Nov. 23, 2004

(86) PCT No.: PCT/IB2004/052518
§ 371 (c)(1),
(2), (4) Date: Feb. 8, 2007

(87) PCT Pub. No.: WO2005/055140
PCT Pub. Date: Jun. 16, 2005

(65) Prior Publication Data
US 2007/0165934 A1 Jul. 19, 2007

(30) Foreign Application Priority Data
Dec. 2, 2003 (EP) ................................. 03104503

(51) Int. Cl.
*G06K 9/00* (2006.01)

(52) U.S. Cl. ...................................................... 382/128
(58) Field of Classification Search .................. 382/128
See application file for complete search history.

(56) References Cited

U.S. PATENT DOCUMENTS

| 6,035,072 | A | 3/2000 | Read | |
|---|---|---|---|---|
| 6,246,746 | B1 * | 6/2001 | Conrads et al. | 378/98.7 |
| 6,747,697 | B1 * | 6/2004 | Lin et al. | 348/246 |
| 2001/0038706 | A1 * | 11/2001 | Eck et al. | 382/132 |
| 2002/0065611 | A1 | 5/2002 | Boehm et al. | |
| 2003/0215120 | A1 * | 11/2003 | Uppaluri et al. | 382/128 |

FOREIGN PATENT DOCUMENTS

WO  WO0205213  1/2002

* cited by examiner

*Primary Examiner*—Bhavesh M Mehta
*Assistant Examiner*—Hadi Akhavannik

(57) ABSTRACT

A method for correcting defects in X-ray images includes identifying potentially defective picture elements (p) in X-ray images (I), created during normal operation, by comparing a value (W(p)) of the picture elements with corresponding values in a neighborhood (n(p)). If a picture element (p) has been classified as "potentially defective" in more than a specified percentage of X-ray images, it is entered in a defect map which is refreshed on a continuous basis. The defect map can then be used to correct other X-ray images.

13 Claims, 3 Drawing Sheets

DEVICE AND METHOD FOR CORRECTING DEFECTS IN X-RAY IMAGES

CROSS REFERENCE TO RELATED APPLICATION

This application claims benefit of foreign priority to PCT No. PCT/IB04/52518, filed Feb. 8, 2007, based on EP application number 03104503.2, filed Dec. 2, 2003, which are incorporated herein in whole by reference.

The invention relates to a method for correcting defects in X-ray images with the aid of a defect map. It also relates to data-processing equipment which is equipped to perform a method of this nature.

Images created using imaging equipment, such as video cameras, digital cameras or X-ray detectors, are generally subjected to processing procedures for correcting different artifacts. For example, an offset reference image is subtracted in X-ray images and divided by a gain reference image in order to compensate for local variations in detector elements. Furthermore, it is normal practice to correct defects in individual image elements, such as pixels, rows or columns using so-called defect maps. Here, for example, X-ray images are corrected at the places marked on the defect map through interpolation of the values of reliable neighboring elements. Defect maps are normally derived in calibration procedures in which a number of homogeneous test images are generated. In view of the fact that defects may occur in the course of the service life of an X-ray detector, the calibration procedures must be repeated from time to time. The periods of time chosen being calibration procedures are normally as long as possible, given the workload involved and the interruption to normal detector operation. However, as a result, new defects may go undetected for long periods and thus remain uncorrected.

A method for operating photocopiers is known from U.S. Pat. No. 6,035,072 in which spatially stationary defects, such as particles of dirt or defective sensor elements from photocopies, which are generated during operation, are detected. A photocopy processed with a median filter is subtracted from the original copy in order to identify potential defects. If necessary, text contained on the copy may also be segmented beforehand in order to exclude these areas from processing. A problem which arises in this type of method is that virtually any level of contrast is classified as a potential defect. Consequently, the method implicitly requires a homogeneous image background, as with lettering on paper. By contrast, during the processing of X-ray images, which contain greatly varying image contents with an additional superimposed quantum noise, a plurality of artifacts would disrupt the detection of defects.

Against this background, it was an object of this invention to provide means for correcting defects in X-ray images simply and reliably.

This object was achieved by means of a method with the attributes claimed in claim 1, as well as by data-processing equipment with the attributes claimed in claim 13. The dependent claims contain advantageous embodiments.

The method in accordance with the invention is used to correct defects in X-ray images, whereby "defects" is understood here to mean pixels which have malfunctioned or become corrupted. Consequently, a defect would typically always appear in the same place in X-ray images. In this regard, the term "picture element" can apply to both an individual picture element (picture sensor, detector element or pixel), as well as to groups of these pixels, in particular to rows or columns of pixels in a detector, or parts thereof. A picture element typically combines all the pixels which, given the physical design of the X-ray detector, may fail together in the event of a fault. A value is assigned to each picture element in an X-ray image. If the picture element is a single pixel, this is the value detected by the sensor (for example, the gray-scale value). If the picture element comprises several pixels, the "value of the picture element" should be understood hereunder to be a suitably created, representative value of the individual pixel values, e.g. their median, minimum, maximum or arithmetic mean.

The method comprises the following steps:

a) In X-ray images which have been pre-corrected with the defect map which is currently valid, picture elements are classified as "potentially defective" if their value differs from the interval of the picture element values in a neighborhood assigned to it by a specified degree. The X-ray images may, in particular, be the useful images generated during the operation of an X-ray detector (in contrast to specially created test images). The neighborhood assigned to a picture element contains some or all of the spatially adjacent pixels or picture elements, various possible topologies being described in greater detail in the description of the drawings.

All the picture elements which are classified as being "potentially defective" are entered on a map, the so-called "candidate map". Some additional information is preferably also saved here, such as a measure of probability for the correctness of the classification.

(b) Refreshing the defect map by adding to the defect map all those picture elements from the candidate map which have been classified as "potentially defective" in several X-ray images with different content and which also fulfill other criteria.

(c) Correcting other or subsequent X-ray images with the aid of the defect map which was refreshed in step b). This correction may be performed in a manner known from the state of the art, for example through interpolation from neighboring values.

The advantage of the method described here is that a defect map can be generated or refreshed with X-ray images which are created while a detector is in operation. Therefore, there is no need to interrupt operation from time-to-time and to create test images in a time-consuming calibration procedure. Even though there are no homogeneously exposed images available, defects are detected with comparatively great certainty because they are based on the isolation deviation of picture elements from their neighborhood.

Together with the picture elements which are classified as "potentially defective", the parameters of the relevant X-ray image are saved in step a) of the method, or the picture elements are indexed by these parameters. The image parameters may, in particular, comprise the beam quality, the dose, the detector temperature and/or the image geometry during the corresponding X-ray imaging. In step b) defect maps are then generated or refreshed for different ranges of values of the image parameters from the picture elements characterized in this way. Several defect maps are thus provided for different image conditions in such a manner that other X-ray images can be corrected each by means of a defect map which matches their image conditions. This method takes due account of the fact that some defects are dependent on the image parameters. For example, some pixels may only fail to work properly when the detector is warming up or if the operating temperatures are comparatively low, whereas they work properly at normal operating temperatures. If a pixel such as this is marked on a single defect map, X-ray images would be corrected needlessly at the relevant place when the detector is operated at normal temperature. If the defect map does not contain the pixel in question, however, X-ray images generated while the detector is warming up remain uncorrected in this place. Optimized defect correction can only take place in all scenarios through use in accordance with the invention of different defect maps for different operating temperatures.

The value of a "potentially defective" picture element in the relevant X-ray image is preferably to be corrected directly, depending on the values of its neighboring picture elements. The value of the picture element may be limited, in particular, by refining it to an interval which commences a certain absolute amount or percentage below the minimum values for the neighboring picture elements or ends a certain absolute amount or percentage above the maximum. By limiting the value of a potentially defective picture element in this way, serious defects which deviate considerably from their assigned values can be pre-corrected or compensated for (in part) immediately when they first appear before they can be proven to be defective with statistical certainty.

In accordance with a similar further embodiment of the method, an X-ray image analyzed in step a) is corrected once again on the basis of the current defect map and the current candidate map. Thus, the provisional result of the ongoing analysis of X-ray images is also used directly here in order to correct them.

The "neighborhood", observed in step a) of the method, assigned to a picture element can always be defined in the same way in accordance with a predefined geometry or topology. However, it is preferably defined on a situation-dependent basis in such a way that it permits the detection of neighboring defective picture elements. If there are two defective picture elements within the same (entire) neighborhood, there is a possibility that no marked discrepancy may be detected during a comparison between the first of the picture elements and its neighborhood. However, the first defect can be detected if the neighborhood is monitored without the second defective picture element.

In accordance with a preferred embodiment of the above version of the method, the neighborhood assigned to a picture element comprises picture elements from a predefined topological or geometric environment whose picture element value lies at least a predefined number n of orders of magnitude behind the maximum and/or minimum for all the picture element values in the entire environment. In other words, picture elements are left out of the environment which possess the highest, second highest, . . . nth highest, or lowest, second lowest, . . . nth lowest etc. picture element value in the environment. This allows defective picture elements to be removed from the environment which are characterized by extreme values.

In accordance with another further embodiment of the method, the classification in step a) excludes picture elements for whose environment the values of the pixels lie outside a predefined range. In other words, regions in which the exposure dose lies outside a specified interval are not scanned for potential defects. Unexposed areas, in particular, such as those which occur behind a patient's metal implant, can thus be excluded from the analysis. This is advantageous because the pixel values located there are essentially determined by the noise of the electronics and are therefore not correlated locally by the mapping process. The exclusion of picture elements is further embodied preferably in such a way that only inter-related ranges of several picture elements are excluded, whereas a single picture element or a few isolated picture elements are not A value for an isolated picture element which deviates from the interval can also be caused by a defect, evidence of which has to be proved.

The measure applied in step a) of the method for gauging the degree to which a picture element value deviates from its neighborhood can be defined in such a way, in particular, that a picture element is classified as "potentially defective" if its value is below the minimum or above the maximum of the values of the picture elements in its neighborhood. In other words, local minimum or maximum values for picture elements are classified as potential defects. As one such local minimum or maximum can also be generated by a real object structure, it is important that the appropriate place only be classified initially as potentially defective and that this assessment be checked through other X-ray images.

The optional criteria which a picture, which has been classified as "potentially defective", has to fulfill in order to be included in the defect map, may be defined in a variety of ways depending on the application. One criterion may be, for example, that the picture element in question has at least been examined in a specified number of X-ray images. Areas such as the edges of a detector field are typically less exposed than the center of the detector. In order to obtain statistically reliable results, it is important to take due account of the actual number of examinations performed on a particular picture element and, in this respect, to stipulate a minimum number.

Another optional criterion is that the picture element in question must have been classified as "potentially defective" in at least a specified number of cases. This also serves to ensure that an adequate degree of statistical certainty exists and that a picture element is not classed as defective on the basis of a single or a few classifications.

A final criterion may be that the picture element in question must have been classified as "potentially defective" in at least a specified percentage of the cases examined. An appropriate percentage must have to be defined depending on the application, for example at approx. 10%. This means that the defect can also include defects which only occur on an intermittent basis ("flashing pixels"). However, pixels which only fail very rarely are not included in the defect map because correcting them would lead to more problems than leaving them uncorrected.

The method described above is preferably performed on a continuous basis with the X-ray images which are generated by an X-ray unit, i.e. the defect map which is used is refreshed continuously or at certain intervals with the aid of the X-ray images which are analyzed on an ongoing basis.

The invention further relates to data-processing equipment which is used to correct defects in X-ray images with the aid of a defect map and which is equipped to perform the following steps:

a) classification of picture elements on an X-ray image which has been pre-corrected with the current defect map as "potentially defective" if their value differs from the interval of the picture element values in a neighborhood assigned to it by a specified degree, and saving of the picture elements thus classified in a candidate map;

(b) refreshing the defect map with all the picture elements from the candidate map which have been classified as "potentially defective" in several X-ray images with different contents and which also fulfill other criteria, where appropriate;

(c) correction of other X-ray images with the aid of the refreshed defect map.

The data-processing equipment can perform a method of the type explained above. Consequently, reference is made to the description above with regard to the details, advantages and further embodiments of the data-processing equipment.

These and other aspects of the invention are apparent from and will be elucidated with reference to the embodiments described hereinafter.

Figure 1:
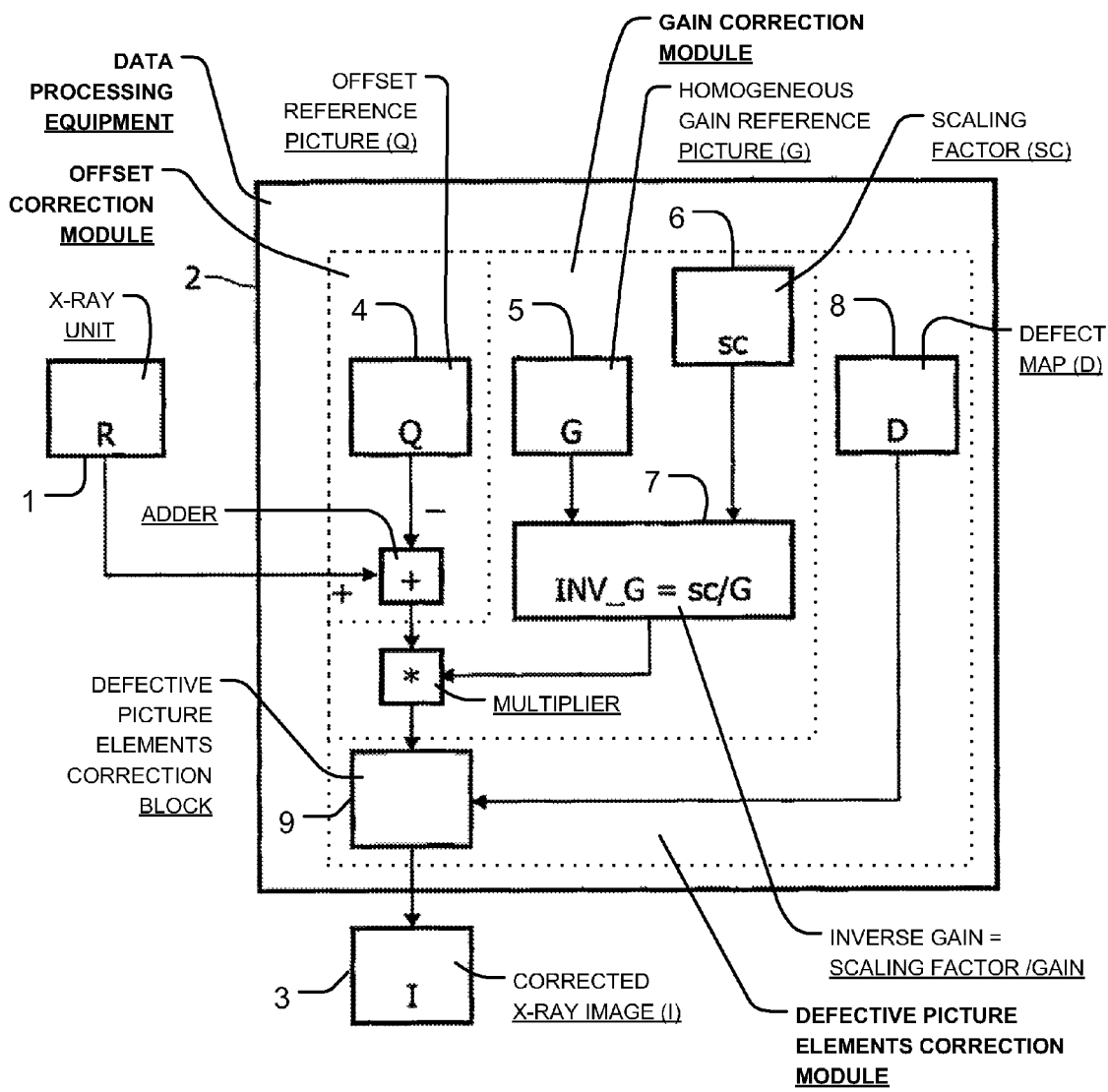
FIG. 1 shows data-processing equipment with various components for correcting X-ray images.

The diagram in FIG. 1 shows the components which are involved in the correction of the X-ray image R, which components are all implemented in data-processing equipment 2 (generally in the form of software modules). Using an X-ray image R which is generated by the X-ray unit 1, an offset correction is initially performed, whereby a dark or offset reference picture Q, which is taken without exposure, is subtracted from the X-ray image R in order to compensate for additive, reproducible picture errors (i.e., offset correction accomplished via components generally indicated in FIG. 1 as the Offset Correction Module). The offset reference picture Q is generally refreshed every few minutes, whereby it is frequently derived by averaging several individual pictures.

Furthermore, a gain correction (i.e., gain correction accomplished via components generally indicated in FIG. 1 as the Gain Correction Module) is performed whereby the offset-corrected X-ray image is divided by an homogeneous gain reference picture G. In order to avoid numerical values less than 1, the quotient is generally multiplied at the same time by a large scaling factor sc (blocks 5, 6, 7).

Finally, the defective picture elements which are marked in a defect map D (block 8) are corrected in block 9 on the basis of their neighboring values (through interpolation, for example) (i.e., defective picture elements correction accomplished via components generally indicated in FIG. 1 as the Defective Picture Elements Correction Module). The correction thereby relates to individual pixels, small groups of pixels, rows or columns in the detector, or parts thereof.

The defect map D is derived in the state of the art from the analysis of many homogeneous test images. Such a calibration must be performed by the X-ray detector service personnel or by the user because it entails the application of X-ray radiation and, thus, may not be automated. The calibration must be repeated at regular intervals because there is a slight probability that other picture elements will also fail during the operation of the X-ray detector. Given the workload involved in calibration, this is typically performed at, large intervals of between one and three months. However, defects which occur in the meantime go undetected for a long time and cause errors in the corresponding X-ray images. Therefore, shorter calibration intervals of between one and three days would be desirable. However, if calibration is performed with this regularity, this generally entails a reduced number of test images which would, in turn, undermine the statistical certainty. Another disadvantage of there being few images is that intermittent defects (flashing pixels) and defects which only occur under certain circumstances (e.g. following switch-on or after very lengthy periods of operation) cannot be detected.

Consequently, a method is proposed here which permits the calculation of a defect map from X-ray images (patient pictures) which are generated while an X-ray detector is in operation. The method generally involves identifying potentially defective picture elements in every X-ray image by comparing their (gray-scale) value with the values in the neighborhood. However, it takes more than simply identification in a single picture for the picture element to be added to a defect map because "rogue positive" identifications would otherwise quickly lead to the number of defects swelling beyond permissible limits. Therefore, the "candidates" which are found in individual pictures are initially entered in a candidate map, C_map. They are not entered definitively in the defect map D until there has been an adequate number of X-ray images done showing that the picture element in question has frequently been identified as defective. The defect map can be refreshed repeatedly in this manner at regular short intervals.

This is mainly based on the fact below that the picture elements are individual pixels. However, the method can also be applied for the purposes of identifying defective rows and/or columns, or parts thereof, whereby in these cases the analysis of pixel values is typically replaced by the examination of extreme, mean average or median values in the picture elements in question.

A pixel is the smallest physical module in an X-ray (flat) detector. For example, a pixel comprises a photodiode, a switching diode or a switching transistor (TFT). The correlation between neighboring pixels is limited by the resolution capability of the system which is described by the MTF (modulation transfer function). Through this limit, each pixel can only differ from its neighboring values by a maximum factor. This maximum difference may, for example, be gauged in images of small grains of lead. Moreover, in clinical X-ray images, the objects themselves are a reason for a strong correlation. For example, the contrast of a smaller grain is primarily smaller than that of a larger grain.

In the case of rows and columns, this means that there is always very strong correlation between their mean averages. The largest conceivable disruption to this correlation would be represented by a very straight, very thin strip of wire running in the direction of the rows and of the columns. Therefore, larger discrepancies which do actually keep occurring between one particular row/column and its neighbors can generally only be explained by functional problems in this row/column.

Following on from these comments, the analysis of an individual picture element p will now be explained in closer detail in accordance with the flowchart in FIG. 2. A pixel p from an X-ray image I (e.g., as indicated by reference numeral 3 in FIG. 1, and which has been pre-corrected with the current defect map) is selected in block 10 of this flowchart, whereby the method shown is performed in sequence for all the pixels in the X-ray image I. Furthermore, a check is performed in block 10 to establish whether the (gray-scale) value W(p) of the picture element lies between the specified limits $W_{min}$ and $W_{max}$, i.e. whether it has been exposed with a medium dose. If so, the value of a test number map (T_map) is increased by one at the place corresponding to the pixel p (block 16), and the picture element p is analyzed further in accordance with the right branch of FIG. 2 to determine whether there is a defect here. The entries in the test number map (T_map) thus record how often each picture element has been analyzed for defects.

The choice of which picture elements p to analyze in practice is made in a different way to the procedure described above. Initially, all the picture elements are entered on an auxiliary map whose value does not lie between $W_{min}$ and $W_{max}$. Following completion, this auxiliary map indicates all the places on the X-ray image which are either unexposed or underexposed and those which are overexposed. Picture elements which are isolated are then removed again from this auxiliary map as they may be the very defects which are being identified. This process of removal can be done, for example, by means of dilatation and, after that, erosion, methods which are known from image processing practice. All picture elements p which are not entered on the auxiliary map in the end are then passed on to the analysis described hereunder.

Figure 3:
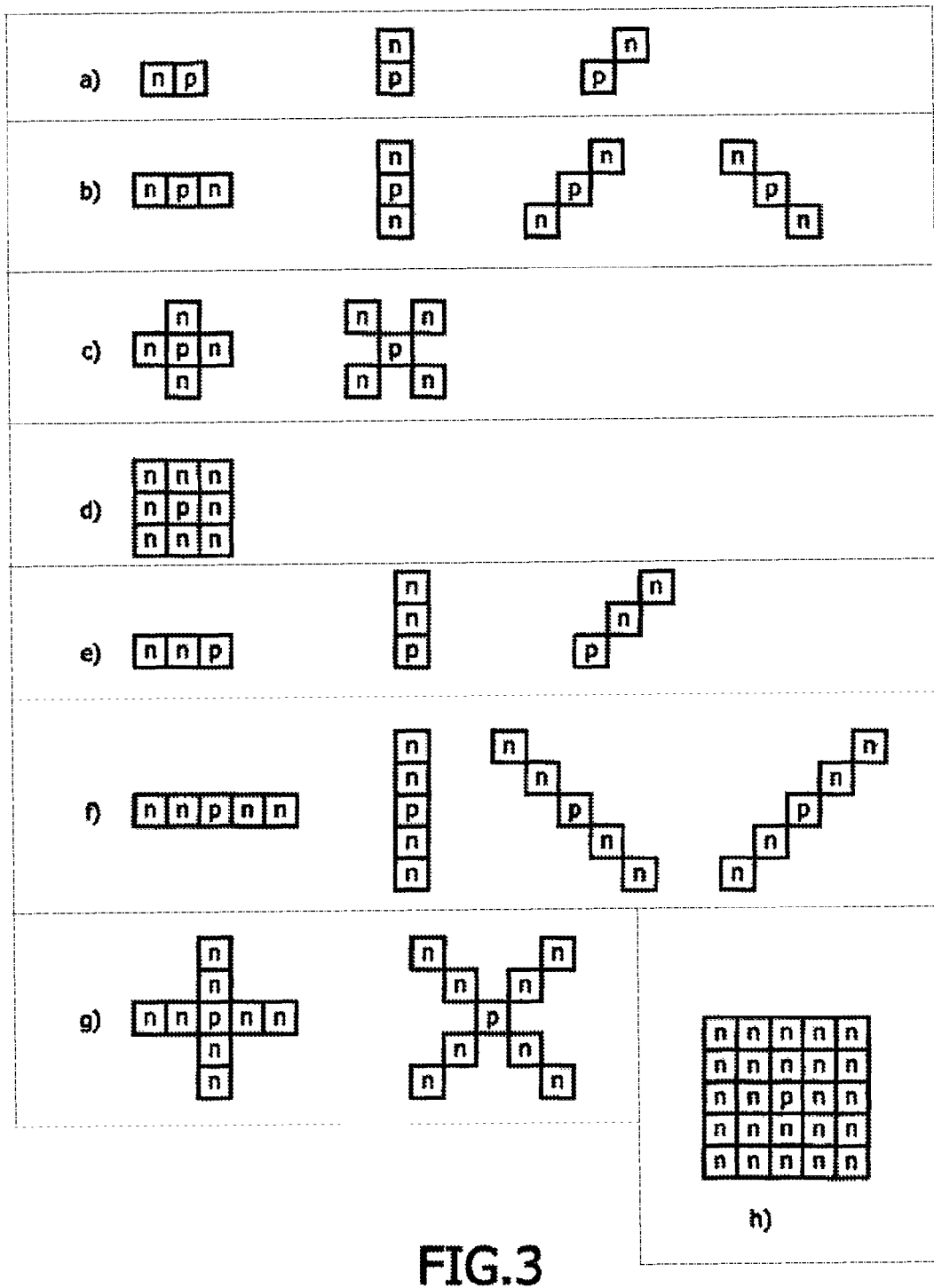
FIG. 3 shows various definitions of a neighborhood for individual pixels.

This analysis of a picture element p, which is selected in block 10, commences in block 11 with the definition of its neighborhood n(p). FIG. 3 shows examples for the possible definitions of neighborhoods (i.e. groups of pixels n) for a given pixel p (further wherein possible definitions for various groups of pixels are illustrated in respective ones of demarcated examples a)-h) of FIG. 3). A neighborhood in accordance with example d) in FIG. 3 is preferred in this case for the analysis of individual pixels p. In order to locate defective rows or columns, defining a neighborhood in accordance with the alternatives in example f) of FIG. 3 would be the most suitable approach.

The minimum and maximum values of the pixels in the neighborhood n(p) are calculated in block 12, i.e. $G\_u := \min(n(p))$ und $G\_o := \max(n(p))$. A check is then performed in block 13 to determine whether the value W(p) of the pixel p lies within the extended interval $[G\_u-\Delta_u, G\_o+\Delta_o]$ of the neighboring values, whereby the intervals $\Delta_u, \Delta_o \geq 0$ may be constant or may be specified depending on the values of the corresponding picture elements. If W(p) lies within the specified interval, the picture element p is not abnormal, and the analysis is ended (block 14). Otherwise, the C_map of potential defects or of "candidates" for defects at the place of picture element p is increased by one in block 17.

Optionally, the value of the picture element p, which is under observation, can also be limited to a maximum value of $W'(p)=G\_o+Ta$ in block 15, whereby Ta>0 is a default interval. By limiting to an extreme value which is just about plausible, the contrast of a defect candidate, which has not been proven with any degree of statistical certainty, has already been reduced. By changing W(p) to the limited value W'(p) for the picture element p, a corrected X-ray image I_corr is generated from the X-ray image I (block 18).

The difference W(p)−W'(p) between the original and the limited picture element values is recorded in block 19 in a log file Da. The log file Da can be used to identify suitable values for the intervals $\Delta_u, \Delta_o, T_a$. A test run is processed on many pictures with $\Delta_u, \Delta_o, T_a=0$, allowing all the maximum values to be detected (including the noise-related maximums), and their differences are entered in the log file. If the log file is shown graphically as a histogram, for example, much of the data will generally lie below a certain value (noise-related), some of the values (extreme values) will lie above it within a certain interval and, there are only some values above that (the sought threshold values lie here) due to actual defects.

The T_map and C_map are preferably interpreted as being a portion of a multi-dimensional candidate matrix which may also contain other information such as the radiation quality, the dose, the detector temperature, a patient identification number, the image type, the projection geometry and such like of the X-ray image I. On the basis of these details, an assurance can be made that two pictures with identical content, which arise during repeat images for example, are not used to identify potential defects as this would cause correlations artificially. Instead, the aim is to use just one image with identical parameters in each case. Furthermore, the additional parameters can only be used to identify picture elements which are only defective under certain marginal conditions. In this regard, different defect maps may be used for different image parameter ranges, or a range of validity in terms of marginal conditions can correspondingly be assigned to each defect in a defect map. With the aid of the defect maps which are extended in this manner, special temperature conditions, switch-on conditions and such like can be corrected with optimized values.

Figure 2:
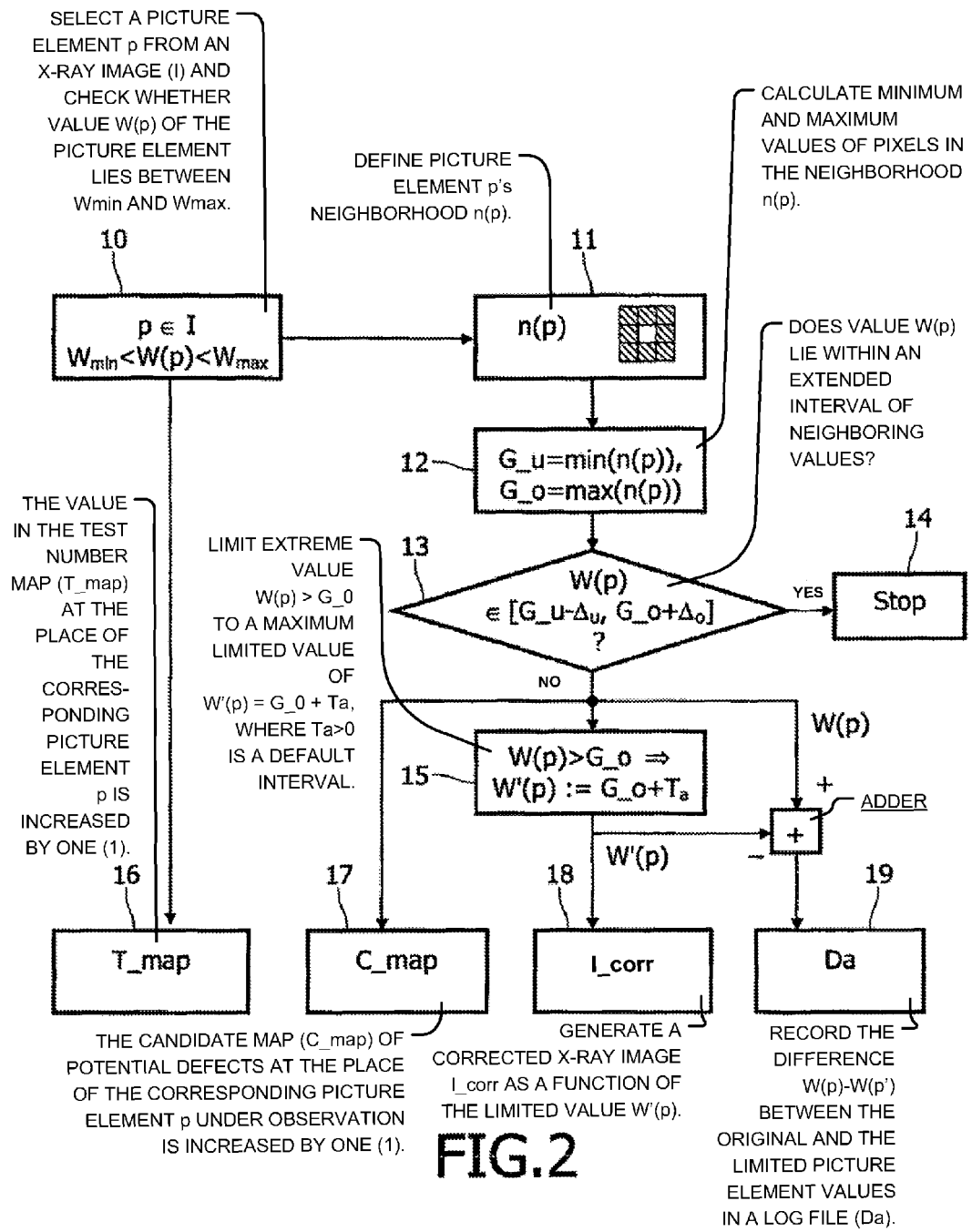
FIG. 2 shows a flowchart of the procedure for checking whether a picture element represents a potential defect.

The defect map D is refreshed at regular intervals (e.g. every 100 X-ray images, once a day or every time the system is started) with the aid of the C_map and the T_map, whereby the procedure for determining them is described in FIG. 2. The first check performed for each picture element p is to determine whether it is entered in the test number map, T_map, more than a minimum number of times, Td (e.g. Td=30). Furthermore, the C_map of potential defects is used to check whether it has been classified as a potential defect more than another minimum number of times, Te (e.g. Te=3).

If the above tests are positive, the percentage in which the picture element p has been classified as defective is calculated (i.e. the quotient of the entries for p in the C_map and the T_map). If this percentage is above a critical threshold Tc (e.g. Tc=10%), the picture element p is entered in the defect map.

Once the defect map has been refreshed in this way, there is preferably a comparison performed of the number of defects marked on it and specified maximum number before the defect map is used. This serves to prevent defect maps being used which have an illegally high number of defects marked on. Optionally, the presence of a high number of defects can be brought to the attention of a user.

The method explained above on the basis of FIG. 2 can be extended and modified in various respects. One possible extension is to facilitate the detection of defect constellations in which there are two or more adjacent defect picture elements. If, for example, two neighboring pixels exhibit extremely high values on the basis of a defect, this cannot be determined by means of the simple method shown in FIG. 2 because neither of the two defective pixels differs markedly from its neighbor (containing the other defective pixel). In order to detect these types of situations, reference can be made to the second highest or second lowest of all the neighboring values by way of a comparison, modifying block 12, i.e. $G\_o := \max_2(n(p))$, $G\_u := \min_2(n(p))$. That means that extreme values in neighboring picture elements which may be defective do not have a detrimental effect on the analysis.

In accordance with a further embodiment of the method, values to indicate the probability that a picture element, which has been classified as potentially defective, actually is defective are entered in the candidate map, the C_map. They can be determined, for example, on the basis of the interval between the relevant picture element value W(p) and its neighboring values G_u, G_o and can be taken into account in the later inclusion of a potential defect into the definite version of the defect map.

Furthermore, the calculation of an X-ray image I_corr, which has been provisionally corrected, can be performed on a more differentiated basis in block 18 and, for example, use both the current defect map D as well as the current candidate map, C_map. This would also serve to correct inaccurate interpolations in the pre-corrected X-ray image I which occur in the places in the defect map D which are adjacent to defects which are first detected in the C_map.

The invention claimed is:

1. A method for correcting defects in X-ray images (R) with the aid of a defect map (D), comprising the steps of:
    (a) checking all picture elements (p) of an X-ray image (I) which has been pre-corrected with a current defect map (D) to determine whether values (W(p)) of a corresponding picture element lies between specified limits $W_{min}$ and $W_{max}$, and if so, then (a.1) making corresponding entries in a test number map (T map) to record how often each picture element has been analyzed for defects and (a.2) classifying respective ones of the picture elements (p) on the X-ray image (I) which has been pre-corrected with the current defect map (D) as potentially defective if their corresponding value (W(p)) differs from an interval ([G_u, G_o]) of picture element values in a neighborhood (n(p)) assigned to it by a specified degree, and saving picture elements (p) thus classified in a candidate map (C_map);

(b) refreshing the defect map (D) with the aid of (b.1) the T map and (b.2) the C map, wherein a first check is performed for each picture element (p) to determine whether it is entered in the T map more than a minimum number of times, and a further check is performed to determine whether the corresponding picture element (p) has been classified as a potential defect more than another minimum number of times, and responsive to positive outcomes of the first and second checks, then refreshing the defect map (D) with all the corresponding picture elements (p) from the candidate map (C_map) (i) which have been classified as potentially defective and (ii) which also fulfill other criteria; and (c) correcting further X-ray images (R) with the aid of the refreshed defect map (D).

2. The method according to claim 1, wherein together with the picture elements (p) classified as potentially defective, the image parameters of the relevant X-ray image (I) are saved in step (a), and that different defect maps are generated for different ranges of values of the specified image parameters.

3. The method according to claim 2, wherein the image parameters relate to beam quality, dose, detector temperature and/or image geometry.

4. The method according to claim 1, wherein the value (W(p)) of a picture element (p) in an X-ray image (I) classified as potentially defective is corrected in dependence on the values of its neighboring picture elements (n(p)).

5. The method according to claim 1, wherein an X-ray image (I) is corrected once again on the basis of the current defect map (D) and the candidate map (C_map).

6. The method according to claim 1, wherein the neighborhood (n(p)) assigned to a picture element (p) is defined such that it permits the detection of mutually neighboring defective picture elements.

7. The method according to claim 6, wherein the neighborhood (n(p)) assigned to a picture element (p) comprises those picture elements (p) from a predefined environment whose picture element value lies at least a specified number n of orders of magnitude below the maximum and/or minimum for all the picture element values in an entire environment.

8. The method according to claim 1, wherein the classification in step (a) excludes those picture elements for whose environment the values of the picture elements lie outside a predefined range ($W_{min}$, $W_{max}$).

9. The method according to claim 1, wherein the picture elements (p) correspond to individual pixels or groups of pixels, wherein the groups of pixels include rows or columns of pixels.

10. The method according to claim 1, wherein a picture element (p) is classified as potentially defective if its value (W(p)) is below the minimum or above the maximum of the values of the picture elements in its neighborhood (n(p)).

11. The method according to claim 1, wherein the other criteria specified in step (b) comprise the following: (i) that the picture element (p) has at least been examined in a specified number of X-ray images (I), (ii) that the picture element (p) has been classified as potentially defective in at least a specified number of cases, and (iii) that the picture element (p) has been classified as potentially defective in at least a specified percentage of the cases examined.

12. The method according to claim 1, wherein the defect map (D) is refreshed continuously with the aid of X-ray images (I) that are analyzed on an ongoing basis.

13. Data-processing equipment to correct defects in X-ray images (R) with the aid of a defect map (D), wherein the data-processing equipment comprises processing components, memory, and software modules equipped to perform:

(a) checking all picture elements (p) of an X-ray image (I) which has been pre-corrected with a current defect map (D) to determine whether values (W(p)) of a corresponding picture element lies between specified limits $W_{min}$ and $W_{max}$, and if so, then (a.1) making corresponding entries in a test number map (T map) to record how often each picture element has been analyzed for defects and (a.2) classifying respective ones of the picture elements (p) on an X-ray image (I), generated via an X-ray unit, which has been pre-corrected with the current defect map (D), via a defective picture elements correction module, as potentially defective if their corresponding value (W(p)) differs from an interval ([G_u, G_o]) of picture element values in a neighborhood (n(p)) assigned to it by a specified degree, and saving picture elements (p) thus classified in a candidate map (C_map) memory;

(b) refreshing the defect map (D) with the aid of (b.1) the T map and (b.2) the C map, wherein a first check is performed for each picture element (p) to determine whether it is entered in the T map more than a minimum number of times, and a further check is performed to determine whether the corresponding picture element (p) has been classified as a potential defect more than another minimum number of times, and responsive to positive outcomes of the first and second checks, then refreshing the defect map (D) with all the corresponding picture elements (p) from the candidate map (C_map) memory (i) which have been classified as potentially defective and (ii) which also fulfill other criteria; and (c) correcting further X-ray images (R) with the aid of the refreshed defect map (D), via the defective picture elements correction module.

* * * * *